United States Patent [19]

Anderson

[11] 4,024,442

[45] May 17, 1977

[54] CAPACITOR AND CAPACITOR ELECTROLYTE

[75] Inventor: Daniel J. Anderson, Indianapolis, Ind.

[73] Assignee: P. R. Mallory & Co., Inc., Indianapolis, Ind.

[22] Filed: June 9, 1975

[21] Appl. No.: 584,986

[52] U.S. Cl. .............................. 361/322; 252/62.2
[51] Int. Cl.$^2$ .......................................... H01G 9/02
[58] Field of Search .................. 252/62.2; 317/230

[56] References Cited

UNITED STATES PATENTS

| | | | |
|---|---|---|---|
| 2,024,210 | 12/1935 | Edelman | 252/62.2 X |
| 3,546,119 | 12/1970 | Chesnot | 252/62.2 |
| 3,609,468 | 9/1971 | Kihara et al. | 317/230 |
| 3,719,602 | 3/1973 | Anderson et al. | 252/62.2 |

*Primary Examiner*—Jack Cooper
*Attorney, Agent, or Firm*—Hoffmann, Meyer & Coles

[57] ABSTRACT

An electrolyte adapted for use in aluminum electrolytic AC motor start type capacitors comprising an acid selected from the group consisting of benzoic acid and toluic acid and mixtures thereof, at least one organic base which at least partially neutralizes the acid, and a solvent of ethylene glycol.

9 Claims, No Drawings

CAPACITOR AND CAPACITOR ELECTROLYTE

The present invention relates to electrolytic capacitors and, more particularly, to electrolytes for aluminum electrolytic AC motor start type capacitors which have good temperature stability and long life.

An aluminum electrolytic capacitor generally includes a pair of aluminum foil electrodes, dielectric spacer material, a container with end seal and a liquid or semi-liquid electrolyte. At least one of the foil electrodes has a dielectric oxide film on its surface and the foils may be etched so as to increase the total surface area of the foil. Typically the foil electrodes are separated by sheets of dielectric spacer material such as paper and are convolutely wound in the form of a roll. The convolutely wound roll is impregnated with the electrolyte and sealed in the container by means of the end seal.

Conventional electrolytes for aluminum electric capacitors generally comprise some type of ionizable compound dissolved in a solvent. One type of electrolyte that has found wide usage is the glycol-borate system. Other known electrolyte types are set forth in U.S. Pat. No. 3,719,602, assigned to the same assignee as the present application. These electrolytes generally consist of a solvent selected from glycol ethers, cyclic organic alcohols and a nitrogen mono or disubstituted amide compounds, an ionogen such as an acid, and a neutralizing base.

Certain types of aluminum electrolytic capacitors find wide application as motor start capacitors for AC electric motors. In these applications, the capacitor is often subjected to relatively high temperatures, up to 100° C and more due to internal temperature rise and to heavy duty cycling, that is, frequent starting of the AC motor accompanied by high voltage and current. A majority of the failures of capacitors in this type of service are due to the inability of most conventional electrolytes to withstand the environmental conditions, especially high temperature conditions. For example, electrolytes containing glycol ether type solvents have a boiling point that is tool low for most AC motor start applications. Thus the use of such solvent based electrolytes may cause catastrophic failure of the capacitor when subjected to relatively high temperatures. In addition, the rolled foil cartridge for most AC motor start capacitors is anchored in the capacitor container by a potting substance such as tar, pitch or other resin, and the electrolyte must be substantially non-reactive to these potting substances. Glycol ether type solvent based electrolytes tend to dissolve these potting substances and thus may allow movement of the foil cartridge relative to the container. In addition, most AC motor start capacitors utilize phenolic type materials as the container for the capacitor and as a portion of the end seal. Electrolytes containing glycol ethers are unsuitable for use in such capacitors because of the tendency of glycol ethers to chemically attack phenolic type materials.

It is therefore a feature of the present invention to provide an electrolyte for an aluminum electrolytic AC motor start type capacitor which has good stability at elevated temperatures. Another feature of the present invention is to provide an electrolyte for an aluminum electrolytic AC motor start type capacitor having good stability under heavy duty cycling conditions. It is yet another feature of the present invention to provide an electrolyte that is substantially non-reactive to potting substances and container materials typically found in conventional AC motor start type capacitors. These and various other features of this invention as well as many specific advantages will become more fully apparent from a detailed consideration of the remainder of this disclosure including the examples and the appended claims.

Generally, the present invention relates to an electrolyte adapted for use in aluminum electrolytic AC motor start type capacitors, the electrolyte containing an acid selected from benzoic acid and toluic acid or mixtures thereof, at least one neutralizing organic base such as an organic amine, and a solvent of ethylene glycol. More specifically the electrolyte may containg from about 2 to 30 wt.% benzoic acid or toluic acid, a tertiary aliphatic amine in amounts sufficient at least partially neutralize the acid and the balance ethylene glycol. The presently preferred pH for the electrolyte is about 6.0 to about 7.5. Examples of tertiary aliphatic amines include triethylamine, tributylamine, tripropylamine, triisopropylamine and trimethylamine. The presently preferred electrolyte consists of about 9 wt.% benzoic acid, about 6 wt.% triethylamine and the remainder ethylene glycol. The invention also comprehends aluminum capacitors containing the above electrolyte.

While the electrolyte of the present invention primarily consists of the above constituents, the electrolyte may also contain certain other substances, for example, water in small amounts, without adversely affecting the characteristics of the electrolyte. These other substances may be present as impurities in the major constituents of the electrolyte and thus the present invention comprehends the presence of such substances in the electrolyte.

When the electrolyte of the present invention is utilized in a AC motor start type capacitor having a phenolic housing and a potting substance of tar, there is little, if any, degradation of these components by the electrolyte. In addition, the electrolyte is able to withstand temperatures of up to about 150° C without significant damage to the capacitor foils and without producing harmful vapor pressures which would cause the capacitor to vent. Capacitors utilizing the electrolyte of the present invention exhibit good temperature stability even at elevated temperature. Changes in capacitance due to changes in temperature are usually within acceptable limits. The electrolyte is also able to withstand frequent cycling conditions that are encountered in AC motor start applications.

Aluminum electrolyte capacitors containing electrolytes of the present invention are characterized as having good temperature stability as the test data presented in the following example will illustrate. It should be understood that this example and those following are given for the purpose of illustration only and the examples do not limit the invention as has heretofore been described.

EXAMPLE I

Six aluminum electrolytic capacitors containing the electrolyte of the present invention are tested for temperature stability. The capacitors contain 185 V. foil, barrier would and rated at 33 ufd for normal usage at 220 VAC. The capacitors also contain an electrolyte consisting of about 9 wt.% benzoic acid, about 6 wt.% triethylamine and the remainder ethylene glycol.

The capacitors are measured for capacitance (C) and dissipation factor (DF) with an applied voltage of about 220 VAC at various temperatures and then the change in capacitance and dissipation factor calculated from the difference in initial reading to final reading. The procedure for the test is to keep the capacitors at each temperature for about four hours to stabilize the internal temperature and then measure C and DF. The results are given below:

|      | +25° C | | −20° C | | −30° C | | −40° C | | +65° C | | +85° C | | +100° C | | 25° C | | % | |
|------|------|------|------|------|------|------|------|------|------|------|------|------|------|------|------|------|------|------|
| Unit | C    | DF   | C    | DF   | C    | DF   | C    | DF   | C    | DF   | C    | DF   | C    | DF   | C    | DF   | ΔC   | ΔDF  |
| A    | 33.0 | 8.45 | 28.7 | 30.9 | 27.7 | 63.9 | 26.1 | 150  | 32.8 | 4.8  | 33.0 | 4.4  | 33.3 | 4.1  | 33.1 | 7.9  | 0.3  | 6.5  |
| B    | 33.8 | 8.79 | 29.2 | 34.2 | 28.0 | 72.2 | 25.8 | 170  | 33.6 | 6.0  | 34.0 | 5.5  | 34.5 | 5.1  | 33.7 | 8.8  | 0.3  | 0.0  |
| C    | 32.6 | 9.1  | 28.1 | 35.5 | 27.4 | 75.3 | 25.3 | 172  | 32.7 | 5.9  | 33.2 | 5.4  | 33.7 | 5.1  | 33.1 | 8.9  | 1.5  | 2.2  |
| D    | 33.0 | 8.85 | 28.8 | 35.6 | 27.5 | 74.8 | 25.7 | 160  | 5.0  | 33.3 | 4.6  | 33.5 | 4.3  | 33.5 | 8.3  | 1.6  | 6.2  |      |
| E    | 32.6 | 9.1  | 28.2 | 35.5 | 26.9 | 75.3 | 24.7 | 170  | 32.2 | 5.5  | 32.8 | 5.0  | 33.2 | 4.6  | 32.5 | 9.1  | 0.3  | 0.0  |
| F    | 33.0 | 8.95 | 28.8 | 35.5 | 27.6 | 72.6 | 25.7 | 160  | 32.1 | 5.5  | 33.6 | 5.0  | 34.0 | 4.6  | 33.7 | 8.8  | 2.1  | 1.7  |

As indicated in the above table, the change in C is generally below 2% and the change in DF below 7%, with half below 3%. For capacitors of this general rating and application, C should be less than 10% and DF less than 20%. As shown, the capacitors containing the electrolyte of this invention far exceed the above standards.

Aluminum electrolytic capacitors containing electrolytes of the present invention are also characterized as having good stability as the life test data presented in the folowing example will illustrate.

EXAMPLE II

A group of five aluminum electrolytic capacitors is tested for change in capacitance over a period of about 30 days while at a constant temperature of about 57° C and a continuous applied voltage of about 55 VAC. The capacitors contain 235 V, single section foil and have phenolic containers. The capacitors are rated about 33 ufd for normal usage at 220 VAC. The capacitors contain an electrolyte consisting of about 9 wt.% benzoic acid, about 6 wt.% triethylamine and the remainder ethylene glycol.

The capacitors are measured for capacitance with applied voltage of about 55 VAC at regular intervals during the 30 day test and the change in capacitance calculated from the difference between the initial capacitance reading and final reading.

The results are as follows:

| Capacitor | Capacitance (μf) at various times (hrs) | | | | | | | from % ΔC 4 hrs. |
|-----------|------|------|------|------|------|------|------|------|
|           | 0    | 4    | 167  | 336  | 503  | 688  | 762  |      |
| A         | 36.9 | 39.5 | 39.5 | 38.8 | 39.5 | 39.4 | 39.4 | 0.25 |
| B         | 36.4 | 40.6 | 38.5 | 38.5 | 39.0 | 39.0 | 39.0 | 3.95 |
| C         | 36.9 | 39.0 | 39.2 | 38.6 | 38.5 | 38.2 | 38.4 | 1.54 |
| D         | 35.6 | 38.2 | 38.1 | 38.0 | 38.5 | 37.7 | 37.9 | 0.78 |
| E         | 36.2 | 38.5 | 37.8 | 37.4 | 38.1 | 37.4 | 37.7 | 2.07 |

As the above table indicates, the change in C from the initial reading to the final reading is below 4%. For capacitors of this rating and application, the change in capacitance over the 30 day time span should be in the range of ±10%. As indicated, the capacitors containing the electrolyte of this invention are well within this range.

EXAMPLE III

A group of six aluminum electrolytic capacitors is tested for the ability of each capacitor to withstand conditions similar to those encountered when the capacitors are used as AC motor start capacitors. The capacitors contain 185 V, barrier wound foil and are rated at about 33 ufd at about 220 VAC. The capacitors contain an electrolyte consisting of about 9 wt.% benzoic acid, about 6 wt.% triethylamine and the remainder ethylene glycol.

In the test, the capacitors are maintained at about 25° C and about every 30 seconds a voltage of about 220 V is applied for a duration of about one second. The application of voltage on a regular basis attempts to simulate the conditions encountered by a capacitor when used as an AC motor start type capacitor. Each application of voltage is typically termed a "start." Capacitance (C) and dissipation factor (DF) are measured at various times up to about 150,000 starts with an applied voltage of about 220 VAC.

The results are as follows:

| Starts (1000s) | 0 | | 10 | | 25 | | 50 | | 75 | | 100 | | 150 | | | |
|----------------|------|-----|------|-----|------|-----|------|------|------|------|------|------|------|------|--------|--------|
| Capacitor      | C    | DF  | C    | DF  | C    | DF  | C    | DF   | C    | DF   | C    | DF   | C    | DF   | ΔC(%)  | ΔDF(%) |
| A              | 33.1 | 8.9 | 32.8 | 6.7 | 32.8 | 9.0 | 32.5 | 10.0 | 32.5 | 10.1 | 32.2 | 10.2 | 32.1 | 10.2 | 3.0    | 14     |
| B              | 33.1 | 8.4 | 33.1 | 8.9 | 33.1 | 8.9 | 33.1 | 10.9 | 32.5 | 10.1 | 32.5 | 9.6  | 32.5 | 10.1 | 1.8    | 20     |
| C              | 33.1 | 8.9 | 33.1 | 9.4 | 33.1 | 9.4 | 33.1 | 9.9  | 32.5 | 10.1 | 32.5 | 10.1 | 32.5 | 10.1 | 1.8    | 13     |
| D              | 33.1 | 8.4 | 32.5 | 9.1 | 32.5 | 9.1 | 32.3 | 9.7  | 32.0 | 9.3  | 32.0 | 9.3  | 32.0 | 10.3 | 3.3    | 23     |
| E              | 33.1 | 8.9 | 32.8 | 9.9 | 32.8 | 9.5 | 32.5 | 10.0 | 32.3 | 10.2 | 32.5 | 10.1 | 32.4 | 10.1 | 2.1    | 13     |
| F              | 33.1 | 8.9 | 33.1 | 9.9 | 33.1 | 9.4 | 33.0 | 9.9  | 32.5 | 10.1 | 32.5 | 10.1 | 32.5 | 10.1 | 1.8    | 13     |

As the above table indicates, the change in capacitance for all capacitors tested after about 150,000 starts is less than about 3% and the change in dissipation factor is less than about 25%, both well within acceptable limits for AC motor start type applications. The change in DF is less than that for capacitors containing conventional electrolytes.

Thus the invention as has been herein described comprehends an electrolyte adapted for use in a AC motor start type capacitor which is characterized by having high temperature stability, long life at conditions typically encountered by AC motor start type capacitors and being substantially non-reactive with the other components of AC motor start type capacitors.

While the present invention has been described with reference to particular embodiments thereof, it will be understood that numerous modifications may be made by those skilled in the art without actually departing from the spirit and scope of the invention as defined in the appended claims.

I claim:

1. An electrolyte adapted for use in an electrolytic AC motor start type capacitor, the electrolyte consisting essentially of about 2 to about 30 wt.% of an acid selected from the group consisting of benzoic acid, toluic acid and mixtures thereof, about 2 to about 30 wt% of at least one tertiary aliphatic amine which at least partially neutralizes the acid, and the remainder ethylene glycol.

2. The electrolyte of claim 1 wherein the tertiary aliphatic amine is selected from the group consisting of, trimethylamine, triethylamine, tripropylamine, triisopropylamine, and tributylamine.

3. The electrolyte of claim 2 wherein the acid is benzoic acid and the amine is triethylamine.

4. The electrolyte of claim 3 wherein the electrolyte has a pH of about 6.0 to about 7.5.

5. The electrolyte of claim 3 wherein the electrolyte consists essentially of about 9 wt.% benzoic acid, about 6 wt.% triethylamine and the remainder ethylene glycol.

6. An aluminum electrolytic capacitor adapted for use as an AC motor start type capacitor comprising at least two aluminum electrodes, at least one of the electrodes having a dielectric oxide film thereon, a container, and an electrolyte in contact with the electrodes, the electrolyte consisting essentially of about 2 to about 30 wt% of an acid selected from the group consisting of benzoic acid, toluic acid and mixtures thereof, about 2 to about 30 wt% of at least one tertiary aliphatic amine which at least partially neutralizes the acid and the remainder ethylene glycol.

7. The capacitor according to claim 6 wherein the amine of the electrolyte is selected from the group consisting of trimethylamine, triethylamine, tripropylamine, triisopropylamine and tributylamine.

8. The capacitor of claim 7 wherein the electrolyte consists essentially of about 9 wt.% benzoic acid, about 6 wt.% triethylamine and the remainder ethylene glycol.

9. The capacitor of claim 7 wherein the container is of phenolic material and contains a potting material including tar which holds the electrodes in place.

* * * * *

UNITED STATES PATENT AND TRADEMARK OFFICE
CERTIFICATE OF CORRECTION

PATENT NO. : 4,024,442
DATED : May 17, 1977
INVENTOR(S) : Daniel J. Anderson

It is certified that error appears in the above-identified patent and that said Letters Patent are hereby corrected as shown below:

Column 1, line 43 delete "tool" and insert --- too ---
Column 2, line 15 delete "containg" and insert --- contain ---
Column 2, line 65 delete "would" and insert --- wound ---
Column 2, line 65 after and, insert --- are ---
Column 3 and 4, first chart, under "+65°C" and "C" delete "5.0" and insert --- 32.8 ---
Column 3 and 4, first chart, under "+65°C" under "DF" delete "33.3" and insert --- 5.0 ---
Column 3 and 4, first chart, under "+85°C" and "C" delete "4.6" and insert --- 33.3 ---
Column 3 and 4, first chart, under "+85°C" and "DF" delete "33.5" and insert --- 4.6 ---
Column 3 and 4, first chart, under "+100°C" and "C" delete "4.3" and insert --- 33.5 ---
Column 3 and 4, first chart, under "+100°C" and "DF" delete "33.5" and insert --- 4.3 ---
Column 3 and 4, first chart, under "25°C" and "C" delete "8.3" and insert --- 33.5 ---
Column 3 and 4, first chart, under "25°C" and "DF" delete "1.6" and insert --- 8.3 ---
Column 3 and 4, first chart, under "%" and "$\Delta$C" delete "6.2" and insert --- 1.6 ---
Column 3 and 4, first chart, under "%" and "$\Delta$DF" under 2.2 insert --- 6.2 ---

UNITED STATES PATENT AND TRADEMARK OFFICE
CERTIFICATE OF CORRECTION

PATENT NO. : 4,024,442

DATED : May 17, 1977

INVENTOR(S) : Daniel J. Anderson

It is certified that error appears in the above-identified patent and that said Letters Patent are hereby corrected as shown below:

Column 3, line 30 delete "folowing" and insert --- following ---
Column 3, line 38 after rated insert --- at ---

Signed and Sealed this

Twentieth Day of June 1978

[SEAL]

Attest:

RUTH C. MASON
Attesting Officer

DONALD W. BANNER
Commissioner of Patents and Trademarks